United States Patent
Yoshimoto et al.

(10) Patent No.: US 10,377,845 B2
(45) Date of Patent: Aug. 13, 2019

(54) GRAFT-MODIFIED PROPYLENE α-OLEFIN COPOLYMERS AND METHODS FOR PRODUCING THE SAME

(71) Applicant: MITSUI CHEMICALS, INC., Tokyo (JP)

(72) Inventors: Koya Yoshimoto, Ichihara (JP); Hidetake Nakano, Ichihara (JP); Tetsuya Nakamura, Sodegaura (JP)

(73) Assignee: MITSUI CHEMICALS, INC., Tokyo (JP)

( * ) Notice: Subject to any disclaimer, the term of this patent is extended or adjusted under 35 U.S.C. 154(b) by 62 days.

(21) Appl. No.: 15/117,959

(22) PCT Filed: Feb. 18, 2015

(86) PCT No.: PCT/JP2015/054376
§ 371 (c)(1),
(2) Date: Aug. 10, 2016

(87) PCT Pub. No.: WO2015/125802
PCT Pub. Date: Aug. 27, 2015

(65) Prior Publication Data
US 2016/0355628 A1 Dec. 8, 2016

(30) Foreign Application Priority Data

Feb. 19, 2014 (JP) ................. 2014-029449

(51) Int. Cl.
*C08F 255/10* (2006.01)
*C08F 255/02* (2006.01)
*C08L 51/06* (2006.01)
*C08L 23/12* (2006.01)
*C08L 77/00* (2006.01)

(52) U.S. Cl.
CPC .......... *C08F 255/10* (2013.01); *C08F 255/02* (2013.01); *C08L 23/12* (2013.01); *C08L 51/06* (2013.01); *C08L 77/00* (2013.01)

(58) Field of Classification Search
CPC .. C08F 255/02; C08F 255/10; C08F 255/023; C08F 255/08; C08L 51/06
See application file for complete search history.

(56) References Cited

U.S. PATENT DOCUMENTS

| 6,184,321 B1 * | 2/2001 | Egraz ................ C08F 2/38 526/233 |
| 8,158,727 B2 | 4/2012 | Onoe et al. |
| 8,609,769 B2 | 12/2013 | Komiya |
| 2002/0061940 A1 * | 5/2002 | Lach .................. C08F 220/18 523/160 |
| 2004/0147684 A1 | 7/2004 | Masuda et al. |
| 2006/0247381 A1 | 11/2006 | Mori et al. |
| 2007/0191547 A1 | 8/2007 | Sekiguchi |
| 2008/0207786 A1 * | 8/2008 | Suzuki .................. C08F 210/18 521/89 |
| 2009/0226728 A1 | 9/2009 | Onoe et al. |
| 2011/0021706 A1 | 1/2011 | Komiya |
| 2012/0135243 A1 | 5/2012 | Onoe et al. |
| 2013/0131288 A1 * | 5/2013 | Stevens ................ B01J 8/226 526/64 |

FOREIGN PATENT DOCUMENTS

| CN | 1930198 A | 3/2007 |
| CN | 101189284 A | 5/2008 |
| CN | 101970579 A | 2/2011 |
| JP | H09-278956 A | 10/1997 |
| JP | 2000-344972 A | 12/2000 |
| JP | 2000-345098 A | 12/2000 |
| JP | 2008-163289 A | 7/2008 |
| WO | WO-2004/106430 A1 | 12/2004 |

OTHER PUBLICATIONS

Mitsui Chemicals, electronic translation of JP 2000-345098 (Dec. 2000).*
Office Action dated May 27, 2017 in Chinese Patent Application No. 201580002665.9.
Coleman et al., "General Theory of Stationary Random Sequences with Applications to the Tacticity of Polymers," Journal of Polymer Science: Part A, vol. 1, No. 10, pp. 3183-3197 (1963).
International Search Report issued in International Patent Application No. PCT/JP2015/054376 dated Mar. 17, 2015.

* cited by examiner

Primary Examiner — Jeffrey C Mullis
(74) Attorney, Agent, or Firm — Foley & Lardner LLP

(57) ABSTRACT

A graft-modified propylene.α-olefin copolymer (A) is obtained by graft-reacting a polar monomer onto a propylene.α-olefin copolymer (a) including 50 to 90 mol % of propylene-derived structural units (C3) and 10 to 50 mol % of $C_{4-8}$ α-olefin-derived structural units (Cα) (wherein the total of the structural units C3 and Cα is 100 mol %), and satisfies the following requirements (i) to (iv) at the same time: (i) the amount of the polar monomer grafted is 0.4 to 1.5 wt %, (ii) the content of the polar monomer is not more than 1000 ppm, (iii) the content of a gel insoluble in xylene at 140° C. is not more than 2.5 wt %, and (iv) the content of a volatile hydrocarbon compound is not more than 10 ppm.

10 Claims, No Drawings

GRAFT-MODIFIED PROPYLENE α-OLEFIN COPOLYMERS AND METHODS FOR PRODUCING THE SAME

TECHNICAL FIELD

The present invention relates to graft-modified propylene.α-olefin copolymers that are free from odor problems, can be dissolved in solvents without leaving insolubles, are emulsifiable to give stable aqueous dispersions, and exhibit high bond strength when used as primers.

BACKGROUND ART

Propylene polymers that are random copolymers of propylene and 1-butene are used in films, sheets and the like because of their excellent properties such as heat resistance, transparency and scratch resistance.

Such propylene polymers are conventionally produced with solid titanium catalysts or metallocene catalysts including an alkylaluminoxane and a metallocene compound such as of zirconium or hafnium.

The conventional propylene polymers produced in the above manner, for example, those propylene polymers produced with solid titanium catalysts generally have a broad molecular weight distribution, and thus articles of the polymers such as films exhibit stickiness. While metallocene-catalyzed propylene polymers have a narrow molecular weight distribution, their heat resistance and heat sealing properties are not always satisfactory.

Due to their molecular structures, propylene polymers exhibit poor adhesion with respect to certain materials such as metals and polar resins. It is therefore necessary to treat the surface of propylene polymers by a method such as flame treatment, corona treatment or primer treatment so that the polymers and such materials as metals can form composite stacks.

To obtain improvements in the properties of polyolefins such as propylene polymers, graft-modified polyolefins are used which are obtained by the graft modification of polyolefins with polar monomers such as maleic acid.

JP-A-H09-278956 discloses a method for producing maleic anhydride-modified polyolefins characterized in that a mixture including 100 parts by weight of a polyolefin, 0.1 to 20 parts by weight of maleic anhydride and 0.01 to 20 parts by weight of an organic peroxide having a one-minute half-life decomposition temperature of 150 to 200° C. is melt-kneaded in a twin-screw kneading extruder to modify the polymer. However, maleic anhydride-modified polyolefins obtained by this production method have a strong odor. Further, dispersing the modified polyolefins into aqueous media results in white turbidity.

Furthermore, primers prepared by dissolving the modified propylene.α-olefin copolymers into solvents such as toluene contain components which are insoluble in the solvents, and this fact causes a decrease in the yield of the primers.

CITATION LIST

Patent Literature

Patent Literature 1: JP-A-H09-278956

SUMMARY OF INVENTION

Technical Problem

An object of the invention is to provide graft-modified propylene.α-olefin copolymers that are free from odor problems and can give aqueous dispersions while ensuring that the occurrence of white turbidity will be avoided and the aqueous dispersions will exhibit stable emulsion properties, and to provide graft-modified propylene.α-olefin copolymers that can be formed into primers without leaving insolubles in solvents and thereby allow primers exhibiting high bond strength to be produced in high yield.

Solution to Problem

The present inventors have found that the graft modification of propylene polymers with use of specific radical initiators result in graft-modified propylene polymers that are free from the problems discussed above, have small amounts of residual maleic acid, contain no crosslinked gels (hereinbelow, also written simply as gels) and can give primers exhibiting excellent bond strength. The present invention has been completed based on the finding.

An aspect of the invention resides in a graft-modified propylene.α-olefin copolymer (A) obtained by graft-reacting a polar monomer onto a propylene.α-olefin copolymer (a) including 50 to 90 mol % of propylene-derived structural units (C3) and 10 to 50 mol % of $C_{4-8}$ α-olefin-derived structural units (Cα) (wherein the total of the structural units C3 and Cα is 100 mol %), the graft-modified propylene.α-olefin copolymer satisfying the following requirements (i) to (iv) at the same time:

(i) the amount of modification with the polar monomer is 0.4 to 1.5 wt %, (ii) the content of the polar monomer is not more than 1000 ppm, (iii) the content of a gel insoluble in xylene at 140° C. is not more than 2.5 wt %, and (iv) the content of a volatile hydrocarbon compound is not more than 10 ppm.

The intrinsic viscosity of the graft-modified propylene.α-olefin copolymer (A) of the invention is preferably 0.5 to 1.0 (dl/g).

Preferably, the propylene.α-olefin copolymer (a) satisfies the following requirements (1) to (3):

(1) the intrinsic viscosity measured at 135° C. in decalin is 0.1 to 12 (dl/g), (2) the molecular weight distribution (Mw/Mn) measured by gel permeation chromatography (GPC) relative to polystyrenes is not more than 3.0, and (3) the parameter value B representing a randomness of a comonomer sequence distribution is 1.0 to 1.5.

In the graft-modified propylene.α-olefin copolymer (A), the α-olefin is preferably 1-butene.

In the graft-modified propylene.α-olefin copolymer (A), it is preferable that the propylene.α-olefin copolymer (a) further satisfy the requirements (4) and (5):

(4) the melting point Tm measured by differential scanning calorimetry (DSC) is 60 to 140° C., and the melting point Tm (T° C.) and the content of 1-butene-derived structural units (M mol %) satisfy $-2.6M+130 \leq T \leq -2.3M+155$, and (5) the degree of crystallinity (C %) measured by X-ray diffractometry and the content of 1-butene-derived structural units (M mol %) satisfy $C \geq -1.5M+75$.

In the graft-modified propylene.α-olefin copolymer (A), the polar monomer is preferably maleic acid or maleic anhydride.

The graft-modified propylene.α-olefin copolymer (A) is preferably one produced by modifying the propylene.α-olefin copolymer (a) by melt-kneading, at a temperature of 120 to 220° C., a mixture including 100 parts by weight of the propylene.α-olefin copolymer (a), 0.1 to 20 parts by weight of maleic anhydride (B) and 0.1 to 1.0 part by weight of an organic peroxide (C) having a one-minute half-life decomposition temperature of 150 to 190° C.

Another aspect of the invention resides in a method for producing a graft-modified propylene.α-olefin copolymer (A) including modifying a propylene.α-olefin copolymer (a) by melt-kneading, at a temperature of 120 to 220° C., a mixture including 100 parts by weight of the propylene.α-olefin copolymer (a), 0.1 to 20 parts by weight of maleic anhydride (B) and 0.1 to 1.0 part by weight of an organic peroxide (C) having a one-minute half-life decomposition temperature of 150 to 190° C.

A still another aspect of the invention resides in a resin composition including the graft-modified polypropylene.α-olefin copolymer (A) and one or more resins selected from polyamide resins and polypropylene resins.

Advantageous Effects of Invention

The graft-modified propylene.α-olefin copolymers according to the invention are free from odor problems and can give aqueous dispersions while ensuring that the occurrence of white turbidity will be suppressed and the aqueous dispersions obtained will exhibit stable emulsion properties. Further, the copolymers can be formed into primers with little insolubles in solvents to ensure a high yield, and the primers obtained exhibit high bond strength. The method for producing graft-modified propylene.α-olefin copolymers according to the invention can produce the graft-modified propylene.α-olefin copolymers with high efficiency.

DESCRIPTION OF EMBODIMENTS

The graft-modified propylene.α-olefin copolymer (A) of the invention is obtained by graft-reacting a polar monomer onto a propylene.α-olefin copolymer (a) including 50 to 90 mol % of propylene-derived structural units (C3) and 10 to 50 mol % of $C_{4-8}$ α-olefin-derived structural units (Cα) (wherein the total of the structural units C3 and Cα is 100 mol %). The graft-modified propylene.α-olefin copolymer (A) satisfies the following requirements (i) to (iv) at the same time:

(i) the amount of modification with the polar monomer is 0.4 to 1.5 wt %, (ii) the content of the polar monomer is not more than 1000 ppm, (iii) the content of a gel insoluble in xylene at 140° C. is not more than 2.5 wt %, and (iv) the content of a volatile hydrocarbon compound is not more than 10 ppm.

〈Propylene.α-Olefin Copolymers (a)〉

The propylene.α-olefin copolymer (a) (hereinafter, also written as the copolymer (a)) is a copolymer of propylene and an α-olefin having 4 to 8 carbon atoms. Examples of the α-olefins include 1-butene, 1-pentene, 1-hexene, 4-methyl-1-pentene, 3-methyl-1-pentene, 1-heptene, 1-octene and 1-decene. 1-Butene, 1-hexene, 4-methyl-1-pentene and 1-octene are preferable, and 1-butene is more preferable. The α-olefins may be used singly, or a plurality of such olefins may be used. As will be described later, large amounts of gels which are insoluble in solvents are generated at times during modification when the α-olefin component in the propylene.α-olefin copolymer (a) is replaced by ethylene, namely, in the graft modification of propylene-.ethylene copolymers, or when part of the α-olefin is replaced by ethylene, namely, in the graft modification of propylene.ethylene.α-olefin terpolymers.

Further, graft-modified products of propylene.ethylene copolymers or propylene.ethylene.α-olefin terpolymers often compare unfavorably to the graft-modified products of the propylene.α-olefin copolymers (a) of the invention in terms of solvent resistance, scratch resistance when formed into films, adhesion when stacked onto polypropylene resin substrates, and workability due to the balance between the melting point and the heat of fusion.

The propylene.α-olefin copolymer (a) contains propylene-derived structural units (C3) in an amount of 50 to 90 mol % and α-olefin-derived structural units (Cα) in an amount of 10 to 50 mol % based on the total of the propylene-derived structural units and the α-olefin-derived structural units taken as 100 mol %, and preferably contains the propylene-derived units in an amount of 60 to 90 mol %, and more preferably 70 to 90 mol % and the α-olefin-derived units in an amount of 10 to 40 mol %, and more preferably 10 to 30 mol %. This ratio of the content of the propylene-derived structural units (C3) ensures that the graft reaction with a polar monomer can be performed at a low temperature to make it possible to prevent the decrease in molecular weight of the propylene.α-olefin copolymer (a) due to thermal degradation.

Preferably, the propylene.α-olefin copolymer (a) satisfies all the requirements (1) to (3) described below. When the propylene.α-olefin copolymer (a) satisfies the requirements (1) to (3), the graft copolymerization of a polar monomer onto the propylene.α-olefin copolymer (a) results in a graft-modified propylene.α-olefin copolymer (A) that exhibits not only excellent rigidity, heat resistance, transparency, scratch resistance and adhesion to metals or polar resins, but also excellent heat sealing properties.

Requirement (1)

The propylene.α-olefin copolymer (a) has an intrinsic viscosity [η] of 0.1 to 12 (dl/g) as measured at 135° C. in decalin. The intrinsic viscosity [η] is preferably 0.5 to 12 (dl/g), and more preferably 1 to 12 (dl/g). The intrinsic viscosity [η] in the above range is advantageous in that the generation of low-molecular components causing a decrease in antiblocking properties can be prevented even when the propylene.α-olefin copolymer (a) is thermally degraded during the graft reaction with a polar monomer.

Requirement (2)

The molecular weight distribution (Mw/Mn) of the propylene.α-olefin copolymer (a) measured by gel permeation chromatography (GPC) relative to polystyrenes is not more than 3.0. The molecular weight distribution (Mw/Mn) is preferably 2.0 to 3.0, and more preferably 2.0 to 2.5. The molecular weight distribution (Mw/Mn) in the above range is advantageous in that the content of low-molecular components causing a decrease in antiblocking properties is low.

Requirement (3)

The parameter value B representing a randomness of the distribution of comonomer sequences in the propylene.α-olefin copolymer (a) is 1.0 to 1.5. The value B is preferably 1.0 to 1.3, and more preferably 1.0 to 1.2.

The parameter value B has been proposed by B. D. Coleman and T. G. Fox (J. Polym. Sci., A1, 3183 (1963)), and is defined as follows.

$$B = P_{12}/(2P_1 \cdot P_2) \qquad \text{[Math. 1]}$$

Here, $P_1$ and $P_2$ are the content fractions of a first monomer and a second monomer, respectively, and $P_{12}$ is the proportion of (first monomer).(second monomer) sequences relative to all the diad sequences.

According to the Bernoulli statistics, the copolymer is a block copolymer when B<1 and is an alternate copolymer when B>1.

As already mentioned, the α-olefin in the propylene.α-olefin copolymer (a) is preferably 1-butene. When the α-olefin is 1-butene, it is preferable that the propylene.α-olefin copolymer (a) further satisfy the following requirements (4) and (5) in addition to the above requirements.

Requirement (4)

The melting point Tm of the propylene.α-olefin copolymer (a) measured with a differential scanning calorimeter is 60 to 140° C. Preferably, the melting point Tm is 70 to 130° C. It is desirable that the melting point Tm (T° C.) and the content of 1-butene-derived structural units (M mol %) satisfy −2.6M+130≤T≤−2.3M+155. When this relationship is satisfied, the modification treatment can be performed at a low temperature using a peroxide that is decomposable at a low temperature.

Requirement (5)

Desirably, the degree of crystallinity (C %) of the propylene.α-olefin copolymer (a) measured by X-ray diffractometry and the content of 1-butene-derived structural units (M mol %) satisfy C≥−1.5M+75. When this relationship is satisfied, a graft-modified propylene.α-olefin copolymer obtained by the modification treatment shows a relatively high crystallization rate and consequently downstream treatments such as pelletizing can be simplified.

Preferably, the propylene.α-olefin copolymer (a) further satisfies the following requirement (6).

Requirement (6)

The triad tacticity (the mm fraction) of the propylene.α-olefin copolymer (a) is not less than 90%, preferably not less than 92%, and more preferably not less than 94%.

The mm fraction indicates how the propylene.α-olefin copolymer (a) is stereoregular, and is defined as the proportion of triad sequences that have the methyl groups branched in the same direction when the polymer chain is expressed as a zigzag structure composed of triad sequences in which three propylene units are head-to-tail coupled. The mm fraction is determined from a $^{13}$C-NMR spectrum.

In the determination of the mm fraction of the propylene.α-olefin copolymer (a) from a $^{13}$C-NMR spectrum, specifically, the sequences that are of interest among the triad sequences including a propylene unit(s) in the polymer chains are (i) head-to-tail coupled propylene triad sequences and (ii) propylene butene triad sequences that are composed of head-to-tail coupled propylene and butene units and have the propylene unit as the second unit.

The intensities (areas) of the peaks assigned to the side-chain methyl groups in the second units (propylene units) in the triad sequences (i) and (ii) are substituted into the following equation to determine the mm fraction.

$$mm \text{ fraction } (\%) = \frac{\text{Intensity of methyl groups } [PPP \text{ (mm)} + PPB \text{ (mm)} + BPB \text{ (mm)}]}{\text{Intensity of methyl groups } [PPP \text{ (mm)} + PPB \text{ (mm)} + BPB \text{ (mm)} + PPP \text{ (mr)} + PPB \text{ (mr)} + BPB \text{ (mr)} + PPP \text{ (rr)} + PPB \text{ (rr)} + BPB \text{ (rr)}]} \times 100$$

[Math. 2]

The mm fraction will be described in detail below. When the propylene.α-olefin copolymer (a) in the invention has a triad tacticity (mm fraction) in the aforementioned range, a graft-modified propylene.α-olefin copolymer (A) resulting from the graft reaction of the copolymer with a polar monomer exhibits a high solidification rate (crystallization rate) to allow the production speed to be enhanced.

To obtain a $^{13}$C-NMR spectrum of the propylene.α-olefin copolymer (a), the propylene.α-olefin copolymer (a) is completely dissolved into hexachlorobutadiene containing a small amount of deuterated benzene as a lock solvent in a sample tube, and the resultant sample is analyzed by complete proton decoupling at 120° C. Measurement conditions are such that the flip angle is 45° and the pulse intervals are at least $3.4T_1$ ($T_1$ is the longest spin-lattice relaxation time of the methyl group). The methylene and methine groups have shorter $T_1$ than the methyl group, and therefore all the carbon atoms in the sample will have a magnetization recovery rate of 99% or more under the above conditions. Based on tetramethylsilane as the reference compound, the chemical shift of the peak assigned to the methyl group carbons of the third units in head-to-tail coupled propylene pentad sequences (mmmm) is defined as 21.593 ppm and the chemical shifts of other carbon peaks are determined based on this peak.

In the $^{13}$C-NMR spectrum of the propylene.α-olefin copolymer (a) recorded as described above, the region having methyl carbon peaks assigned to the side-chain methyl groups of the propylene units (approximately 19.5 to 21.9 ppm) is divided into the first peak subregion (approximately 21.0 to 21.9 ppm), the second peak subregion (approximately 20.2 to 21.0 ppm) and the third peak subregion (approximately 19.5 to 20.2 ppm). In these subregions, the side-chain methyl groups in the second units (propylene units) of the head-to-tail coupled triad sequences (i) and (ii) give peaks as described in Table 1.

TABLE 1

| | | Methyl carbon region (19.5-21.9 ppm) | | |
| --- | --- | --- | --- | --- |
| | Shifts | First sub-region (ppm) 21.0-21.9 | Second sub-region (ppm) 20.2-21.0 | Third sub-region (ppm) 19.5-20.2 |
| Head-to-tail coupled | Sequences (i) | PPP (mm) | PPP (mr) | PPP (rr) |
| | Sequences (ii) | PPB (mm) BPB (mm) | PPB (mr) BPB (mr) PPB (rr) BPB (rr) | |

In the table, P denotes a propylene-derived unit and B denotes a 1-butene-derived unit. Of the head-to-tail coupled triad sequences (i) and (ii) shown in the above table, the triad sequences (i) consisting of three propylene units, namely, PPP (mm), PPP (mr) and PPP (rr) are illustrated below as zigzag structures reflecting the directions of the branching of the methyl groups. The mm, mr and rr couplings in the PPP sequences (i) also apply to the triad sequences (ii) including butene units (PPB and BPB).

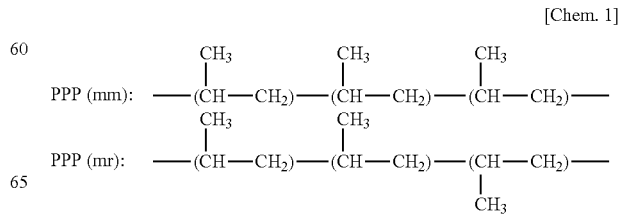

[Chem. 1]

-continued

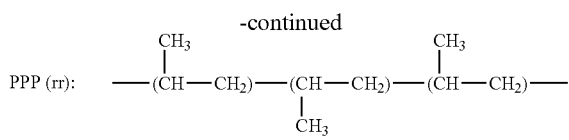

PPP (rr):

In the first subregion, the methyl groups in the second units (propylene units) of the mm-coupled triad sequences PPP, PPB and BPB give resonance peaks. The second subregion shows resonance peaks of the methyl groups in the second units (propylene units) of the mr-coupled triad sequences PPP, PPB and BPB, and resonance peaks assigned to the methyl groups in the second units (propylene units) of the rr-coupled triad sequences PPB and BPB. In the third subregion, the methyl groups in the second units (propylene units) of the rr-coupled triad sequences PPP give a resonance peak. Thus, as indicated by the equation described above, the triad tacticity (the mm fraction) of the propylene.α-olefin copolymer (a) is measured as the proportion (in percentage) of the area of the peaks observed at 21.0 to 21.9 ppm (the first subregion) relative to the total area of the peaks found at 19.5 to 21.9 ppm (the methyl carbon region) taken as 100%.

In addition to the head-to-tail coupled triad sequences (i) and (ii), the propylene.α-olefin copolymer (a) has small amounts of partial structures which include regioerrors represented by the structures (iii), (iv) and (v) below. The side-chain methyl groups in propylene units having such other types of coupling also give rise to peaks in the methyl carbon region (19.5 to 21.9 ppm).

20.7 ppm), EPE-methyl groups (side-chain methyl groups in ethylene-propylene-ethylene sequences) (near 19.8 ppm), the methyl groups C, the methyl groups D, the methyl groups D', the methyl groups E and the methyl groups E'.

As described above, the methyl carbon region shows peaks assigned to the methyl groups that do not meet the head-to-tail coupled triad sequences (i) and (ii). In the calculation of the mm fraction using the aforementioned equation, these peaks are corrected in the following manner.

The peak area based on the PPE-methyl groups can be determined from the peak area of PPE-methine groups (resonating at near 30.6 ppm), and the peak area based on the EPE-methyl groups can be determined from the peak area of EPE-methine groups (resonating at near 32.9 ppm).

The peak area based on the methyl groups C can be determined from the peak area of the adjacent methine groups (resonating at near 31.3 ppm). The peak area based on the methyl groups D can be determined by halving the total of the peak areas of the peaks assigned to the α and β methylene carbons in the structures (iv) (resonating at near 34.3 ppm and at near 34.5 ppm). The peak area based on the methyl groups D' can be determined from the area of the peak assigned to the methine groups (resonating at near 33.3 ppm) adjacent to the methyl groups E' in the structures (v). The peak area based on the methyl groups E can be determined from the peak area of the adjacent methine carbons (resonating at near 33.7 ppm). The peak area based on the methyl groups E' can be determined from the peak area of the adjacent methine carbons (resonating at near 33.3 ppm).

[Chem. 2]

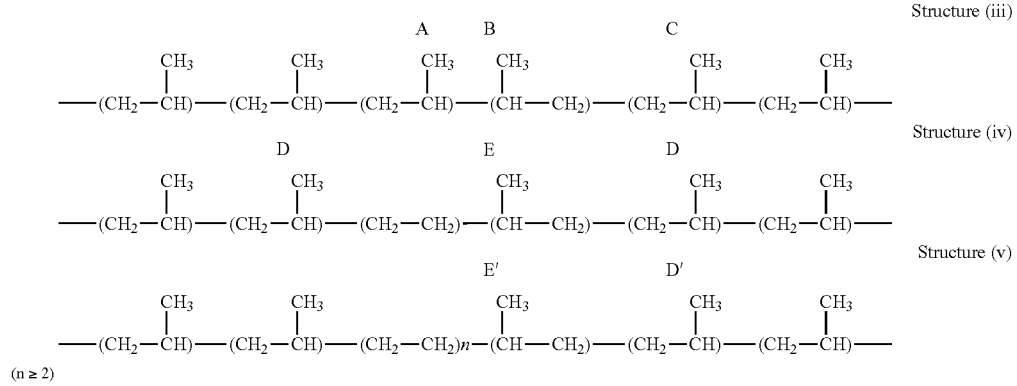

Of the methyl groups in the above structures (iii), (iv) and (v), the methyl group carbon A and the methyl group carbon B resonate at 17.3 ppm and at 17.0 ppm, respectively, and therefore the peaks assigned to the carbon A and the carbon B are outside the first to third subregions (19.5 to 21.9 ppm). Further, the carbon A and the carbon B do not constitute head-to-tail coupled propylene triad sequences, and therefore do not need to be considered in the calculation of the triad tacticity (the mm fraction).

The methyl group carbon C, the methyl group carbon D and the methyl group carbon D' give rise to peaks in the second subregion, and the methyl group carbon E and the methyl group carbon E' show peaks in the third subregion.

Thus, the first to third methyl carbon subregions show peaks assigned to PPE-methyl groups (side-chain methyl groups in propylene-propylene-ethylene sequences) (near Thus, the peak areas of the methyl groups based on the head-to-tail coupled propylene triad sequences (i) and (ii) can be determined by subtracting the above peak areas from the total of the peak areas in the second and third subregions.

The peak areas of the methyl groups based on the head-to-tail coupled propylene triad sequences (i) and (ii) can be estimated in the above manner, and the mm fraction can be determined using the equation described hereinabove.

[Methods for Preparing Propylene.α-Olefin Copolymers (a)]

The propylene.α-olefin copolymer (a) used in the invention can be prepared with a multisite catalyst such as a Ziegler catalyst, or with a single site catalyst such as a metallocene catalyst. The polymerization of propylene with the α-olefin may be performed by a liquid-phase polymerization process such as suspension polymerization or solution polymerization, or by a gas-phase polymerization process.

⟨Polar Monomers⟩

The graft-modified propylene.α-olefin copolymer (A) of the present invention can be obtained by graft-polymerizing a polar monomer onto the propylene.α-olefin copolymer (a) described hereinabove.

Examples of the polar monomers include hydroxyl group-containing ethylenically unsaturated compounds, amino group-containing ethylenically unsaturated compounds, epoxy group-containing ethylenically unsaturated compounds, aromatic vinyl compounds, unsaturated carboxylic acids and derivatives thereof, vinyl ester compounds, and vinyl chlorides. Unsaturated carboxylic acids and derivatives thereof are preferably used.

Examples of the unsaturated carboxylic acids and derivatives thereof include such unsaturated carboxylic acids as acrylic acid, methacrylic acid, maleic acid, fumaric acid, tetrahydrophthalic acid, itaconic acid, citraconic acid, crotonic acid, isocrotonic acid, norbornenedicarboxylic acid and bicyclo[2,2,1]hept-2-ene-5,6-dicarboxylic acid, and derivatives thereof such as acid anhydrides, acid halides, amides, imides and esters. Of these, maleic acid and maleic anhydride are preferable.

⟨Methods for Producing Modified Propylene.α-Olefin Copolymers (A)⟩

In the production of the graft-modified propylene.α-olefin copolymer (A) of the invention (hereinafter, also written as the modified copolymer (A)), the polar monomer is usually used in an amount of 0.01 to 30 parts by weight, preferably 0.05 to 25 parts by weight, and more preferably 0.1 to 20 parts by weight per 100 parts by weight of the propylene.α-olefin copolymer (a). When the polar monomer is maleic anhydride, the amount of maleic anhydride is usually 0.1 to 20 parts by weight, preferably 0.1 to 15 parts by weight, and more preferably 0.1 to 10 parts by weight based on 100 parts by weight of the propylene.α-olefin copolymer (a). The above amount of the polar monomer advantageously ensures that the polar monomer can be uniformly dispersed in the propylene.α-olefin copolymer (a).

The graft polymerization is performed in the presence of a radical initiator. An organic peroxide having a decomposition temperature of 150 to 190° C. at which the half-life is one minute is used as the radical initiator.

Examples of the organic peroxides having a one-minute half-life decomposition temperature (hereinafter, also written simply as decomposition temperature) of 150 to 190° C. include 1,1-di(t-butylperoxy)cyclohexane (decomposition temperature 153.8° C.), 2,2-di(4,4-di-(t-butylperoxy)cyclohexyl)propane (decomposition temperature 153.8° C.), t-hexyl peroxyisopropyl monocarbonate (decomposition temperature 155.0° C.) t-butylperoxymaleic acid (decomposition temperature 167.5° C.), t-butylperoxy-3,5,5-trimethyl hexanoate (decomposition temperature 166.0° C.), t-butyl peroxylaurate (159.4° C.), t-butyl peroxyisopropyl monocarbonate (decomposition temperature 158.8° C.), t-butyl peroxy-2-ethylhexyl monocarbonate (decomposition temperature 161.4° C.), t-hexyl peroxybenzonate (decomposition temperature 160.3° C.), 2,5-dimethyl-2,5-di(benzoylperoxy)hexane (decomposition temperature 158.2° C.), t-butyl peroxyacetate (decomposition temperature 159.9° C.), 2,2-di(t-butylperoxy)butane (decomposition temperature 159.9° C.), t-butyl peroxybenzoate (decomposition temperature 166.8° C.), n-butyl 4,4-di(t-butylperoxy)valerate (decomposition temperature 172.5° C.), di(2-t-butylperoxyisopropyl)benzene (decomposition temperature 175.4° C.), dicumyl peroxide (decomposition temperature 175.2° C.), di-t-hexyl peroxide (decomposition temperature 176.7° C.), 2,5-dimethyl-2,5-di(t-butylperoxy)hexane (decomposition temperature 179.8° C.), t-butyl cumyl peroxide (decomposition temperature 173.3° C.) and di-t-butyl peroxide (decomposition temperature 185.9° C.). Of these, 2,5-dimethyl-2,5-di(t-butylperoxy)hexane is preferable.

The organic peroxide having a one-minute half-life decomposition temperature of 150 to 190° C. is usually added in an amount of 0.1 to 1.0 part by weight, and preferably 0.2 to 0.9 parts by weight per 100 parts by weight of the propylene.α-olefin copolymer (a). If the amount is less than 0.1 part by weight, the graft reaction may not proceed sufficiently. Adding more than 1.0 part by weight of the organic peroxide may cause a decrease in molecular weight due to the breakage of molecules by the β-cleavage of the molecular chains (the main chains) of the copolymer (a) and a consequent decrease in the mechanical characteristics of the modified copolymer (A).

The organic peroxide as the radical initiator may be mixed directly with the propylene.α-olefin copolymer (a) or the polar monomer, or may be used in the form of a solution in an organic solvent.

The organic solvent used is not particularly limited as long as the solvent is an organic solvent capable of dissolving the radical initiator. Examples include aromatic hydrocarbon solvents such as benzene, toluene and xylene, aliphatic hydrocarbon solvents such as pentane, hexane, heptane, octane, nonane and decane, alicyclic hydrocarbon solvents such as cyclohexane, methylcyclohexane and decahydronaphthalene, chlorinated hydrocarbons such as chlorobenzene, dichlorobenzene, trichlorobenzene, methylene chloride, chloroform, carbon tetrachloride and tetrachloroethylene, alcohol solvents such as methanol, ethanol, n-propynol, i-propanol, n-butanol, 2-butanol, i-butanol and t-butanol, ketone solvents such as acetone, methyl ethyl ketone and methyl isobutyl ketone, ester solvents such as ethyl acetate and dimethyl phthalate, and ether solvents such as dimethyl ether, diethyl ether, di-n-amyl ether, tetrahydrofuran and dioxyanisole.

Further, the graft polymerization of the polar monomer onto the propylene.α-olefin copolymer (a) may involve a reducing substance. The use of a reducing substance can increase the amount in which the polar monomer is grafted.

Examples of the reducing substances include iron (II) ions, chromium ions, cobalt ions, nickel ions, palladium ions, sulfite salts, hydroxylamines, hydrazines, and compounds containing such groups as —SH, $SO_3H$, —$NHNH_2$ and —COCH(OH)—.

Specific examples of such reducing substances include ferrous chloride, potassium dichromate, cobalt chloride, cobalt naphthenate, palladium chloride, ethanolamine, diethanolamine, N,N-dimethylaniline, hydrazine, ethyl mercaptan, benzenesulfonic acid and p-toluenesulfonic acid.

The reducing substance can be usually used in an amount of 0.001 to 5 parts by weight, and preferably 0.1 to 3 parts by weight per 100 parts by weight of the propylene.α-olefin copolymer (a).

The graft modification of the propylene.α-olefin copolymer (a) with the polar monomer is performed by melt-kneading a mixture including the propylene.α-olefin copolymer (a), the polar monomer and the radical initiator in a device such as an extruder.

This reaction is desirably carried out at a temperature of not less than the melting point of the propylene.α-olefin copolymer (a), usually at a temperature of 120 to 220° C., and preferably 120 to 210° C., for 0.5 to 10 minutes. Kneading at this range of temperatures is advantageous in that the decrease in molecular weight can be prevented and the amount of gel byproducts can be decreased. The amount of modification (the amount of the polar monomer grafted) in the graft-modified propylene.α-olefin copolymer (A) is usually 0.4 to 1.5 wt %, preferably 0.4 to 1.4 wt %, more preferably 0.5 to 1.3 wt %, still more preferably 0.6 to 1.2 wt %, and particularly preferably 0.6 to 1.0 wt %.

⟨Graft-Modified Propylene.α-Olefin Copolymers (A)⟩

The graft-modified propylene.α-olefin copolymer (A) according to the present invention satisfies the following requirements (i) to (iv) at the same time.

Requirement (i)

As described above, the amount of modification (the amount of grafting) by the polar monomer is 0.4 to 1.5 wt %. If the amount of modification is less than 0.4 wt %, sufficient bond strength is not obtained. Any modification in an amount exceeding 1.5 wt % generally involves increased amounts of the polar monomer and the organic peroxide used for the graft modification of the copolymer, and can lead to disadvantages such as a failure for the graft-modified propylene.α-olefin copolymer (A) of the invention to satisfy the low gel content requirement, a decrease in intrinsic viscosity due to the breakage of the main chains, and a contamination of, for example, a primer including the modified copolymer (A).

Requirement (ii)

The content of the polar monomer in the modified copolymer (A) is not more than 1000 ppm.

The content of the polar monomer is the content of the residual polar monomer that remains unreacted in the graft-modified propylene.α-olefin copolymer (A) of the invention, specifically, the content of the residual unreacted polar monomer relative to the graft-modified propylene.α-olefin copolymer (A) produced by the reaction of the propylene α-olefin copolymer (a) and the polar monomer. The content of the polar monomer is preferably not more than 500 ppm, and more preferably not more than 300 ppm. When the content of the polar monomer is not more than 1000 ppm, the odor of the modified copolymer (A) can be reduced to an insignificant level and the occurrence of white turbidity during the preparation of an aqueous dispersion of the modified copolymer (A) can be prevented.

Requirement (iii)

In the graft-modified propylene.α-olefin copolymer (A), the content of a gel that is insoluble in xylene at 140° C. is not more than 2.5 wt %. The gel content is preferably not more than 2.0 wt %. If the gel content is above 2.5 wt %, the use of the modified copolymer (A) as a solution in a solvent or as an aqueous dispersion requires the addition of purification steps such as microfiltration steps, thus causing the process to be prolonged. Further, an increased proportion of the modified copolymer (A) remains undissolved in a solvent during the preparation of a primer using the modified copolymer (A), causing a decrease in yield. Such a high gel content also leads to a decrease in yield in the production of the modified copolymer (A).

Requirement (iv)

In the graft-modified propylene.α-olefin copolymer (A), the content of a volatile hydrocarbon compound is not more than 10 ppm. When the content of a volatile hydrocarbon compound is not more than 10 ppm, the odor of the modified copolymer (A) can be reduced to an insignificant level to enhance the working safety of operators and also the modified copolymer can comply with the VOC emission limits.

The content of a volatile hydrocarbon compound is preferably not more than 5 ppm. The volatile hydrocarbons are hydrocarbon compounds having a boiling point of 180° C. or less at 1 atm. Examples of such compounds include n-hexane and regioisomers thereof, n-heptane and regioisomers thereof, n-octane and regioisomers thereof, toluene, and p-xylene and isomers thereof.

As described in the "production of modified propylene.α-olefin copolymers (A)", the organic peroxide having a one-minute half-life decomposition temperature of 150 to 190° C. is used as the radical initiator. With this configuration, the modified propylene.α-olefin copolymer obtained by the production method satisfies the requirements described above. Thus, the copolymer can be dissolved into a solvent such as toluene to give a primer which contains little insolubles, and the decrease in yield can be prevented.

The graft-modified propylene.α-olefin copolymer (A) usually has an intrinsic viscosity [η] of 0.1 to 5 (dl/g), more preferably 0.2 to 3 (dl/g), and still more preferably 0.5 to 1.0 (dl/g) as measured in decalin at 135° C. If the intrinsic viscosity [η] is less than 0.1 (dl/g), the modified copolymer (A) may not exhibit sufficient strength. If, on the other hand, the intrinsic viscosity [i] is above 5 (dl/g), a dispersion of the modified copolymer (A) in, for example, an aqueous medium may exhibit poor emulsion stability or may be white turbid.

The graft-modified propylene.α-olefin copolymer (A) has a melting point of 60 to 140° C., and preferably 70 to 130° C., and a degree of crystallinity of 20 to 60%, and preferably 30 to 55%.

The value B of the graft-modified propylene.α-olefin copolymer (A) (the value B is determined from the propylene units and the 1-butene units) is substantially the same as the value B of the propylene.α-olefin copolymer (a) before the modification. It is desirable that the molecular weight distribution (Mw/Mn) be not significantly changed from the value before the modification.

Another aspect of the invention resides in resin compositions including the graft-modified propylene.α-olefin copolymer (A) and one or more resins selected from polyamide resins (P) and polypropylene resins (Q). Specific forms of the compositions are as follows.

(1) A resin composition (X) including the graft-modified propylene.α-olefin copolymer (A) and a polyamide resin (P).

(2) A resin composition (Y) including the graft-modified propylene.α-olefin copolymer (A) and a polypropylene resin (Q).

(3) A resin composition (Z) including the graft-modified propylene.α-olefin copolymer (A), a polyamide resin (P) and a polypropylene resin (Q).

The resin composition (X) includes the polyamide resin (P) in 50 to 99 wt %, and preferably 60 to 90 wt %, and (A) the graft-modified propylene.α-olefin copolymer (A) in 1 to 50 wt %, and preferably 10 to 40 wt % (wherein the total of (P) and (A) is 100 wt %). The resin composition (X) exhibits flexibility and impact resistance without incurring a significant decrease in heat resistance inherent to the polyamide resin (P).

The resin composition (Y) includes the propylene resin (Q) in 1 to 60 wt %, and preferably 5 to 50 wt %, and (A) the graft-modified propylene.α-olefin copolymer (A) in 40 to 99 wt %, and preferably 50 to 95 wt % (wherein the total of (Q) and (A) is 100 wt %). The resin composition (Y) exhibits flexibility and impact resistance without incurring a significant decrease in rigidity and heat resistance balanced in the polypropylene resin (Q). The resin composition (Y) is suitably used as a raw material for an aqueous dispersion, or as a primer layer applied between a soluble polypropylene and an acrylic resin or a polyester resin.

The resin composition (Z) includes the polyamide resin (P) in 20 to 80 wt %, and preferably 30 to 70 wt %, the polypropylene resin (Q) in 10 to 50 wt %, and preferably 20 to 45 wt %, and (A) the graft-modified propylene.α-olefin copolymer (A) in 1 to 30 wt %, and preferably 3 to 25 wt % (wherein the total of (P), (Q) and (A) is 100 wt %). The resin composition (Z) contains the graft-modified propylene.α-olefin copolymer (A) as a compatibilizer. Consequently, the polyamide resin (P) and the polypropylene resin (Q) are highly compatible in the resin composition. Further, the resin composition (Z) exhibits excellent tensile strength and impact resistance, and has excellent appearance. The resin composition (Z) is free from deteriorations in properties inherent to the polyamide resin (P) and the polypropylene resin (Q) such as low water absorptivity, heat resistance, chemical resistance and bending elasticity.

In addition to the components (A), (P) and (Q), the resin compositions of the invention may contain appropriate additives in accordance with the desired applications such as heat stabilizers, UV absorbers, anti-blocking agents, slip agents and antistatic agents.

The amount of such additives is usually in the range of 0.01 to 1 wt %, and preferably 0.02 to 0.6 wt % based on 100 wt % of the resin composition.

The resin compositions of the invention may be prepared by any methods without limitation. Conventional methods may be used, with examples including mixing with a mixing device such as a twin-cylinder mixer, a ribbon blender or a Henschel mixer, and kneading with a kneading device such as an extruder, a mixing roll, a Banbury mixer or a kneader. These methods may be performed in combination or singly.

The resin compositions of the invention that are obtained may be formed into shapes such as pellets or granules with a device such as an extruder, or may be shaped directly into articles.

EXAMPLES

In Examples described below, data such as properties of polymers were measured by the following methods.
(1) 1-Butene Content
The 1-butene content was determined by $^{13}$C-NMR.
(2) Melt flow rate (MFR)
The melt flow rate was measured in accordance with ASTM D 1238 at 230° C. under a load of 2.16 kg.
(3) Molecular Weight Distribution (Mw/Mn)
The molecular weight distribution (Mw/Mn) was determined as follows using GPC-150C manufactured by Millipore.

The separatory column was TSK GNH HT having a diameter of 27 mm and a length of 600 mm. The column temperature was 140° C. The mobile phase was o-dichlorobenzene (Wako Pure Chemical Industries, Ltd.) containing 0.025 wt % of BHT (Takeda Pharmaceutical Company Limited) as an antioxidant. The mobile phase was pumped at 1.0 ml/min. The sample concentration was 0.1 wt %, and the sample injection amount was 500 µl. A differential refractometer was used as the detector. For molecular weights Mw<1000 and Mw>4×10$^6$, polystyrene standards manufactured by Toso Corporation were used. For molecular weights 1000<Mw<4×10$^6$, polystyrene standards from Pressure Chemical Company were used.

(4) Value B
The parameter value B represents a randomness of the comonomer sequence distribution. In a sample tube having a diameter of 10 mm, approximately 200 mg of a copolymer was dissolved uniformly into 1 ml of hexachlorobutadiene to give a sample, which was then analyzed by $^{13}$C-NMR spectroscopy at a measurement temperature of 120° C., a measurement frequency of 25.05 MHz, a spectrum width of 1500 Hz, a filter width of 1500 Hz, a pulse repetition time of 4.2 sec and a number of scans of 2000 to 5000 times. The spectrum was analyzed to determine P1, P2 and P12, and the parameter was calculated based on the fractions obtained.
(5) Melting point (Tm)
Approximately 5 mg of a sample was placed into an aluminum pan and was heated to 200° C. at 10° C./min. After being held at 200° C. for 5 minutes, the sample was cooled to −100° C. at 10° C./min and the temperature was increased at 10° C./min. The melting point was determined from the endothermic curve recorded during the second heating process. The measurement involved DSC-RDC220 manufactured by Seiko Instruments Inc.
(6) Amount of Maleic Anhydride Grafted
The amount of maleic anhydride grafted was determined by comparing an FT-IR spectrum to a separately obtained calibration curve with respect to the intensity of the peak at 1780 cm$^{-1}$ assigned to the carbonyl groups.
(7) Amount of Residual Maleic Acid
Approximately 1 g of a graft-modified propylene.α-olefin copolymer was extracted with a xylene/water mixed solvent. The polymer in the extracted solution was removed, and maleic acid was separated by liquid chromatography using a reverse phase column. The amount of residual maleic acid was determined based on a calibration curve that had been obtained separately.
(8) Intrinsic Viscosity [η]
The intrinsic viscosity was measured in decal in at 135° C.
(9) Degree of Crystallinity
A graft-modified propylene.α-olefin copolymer was pressed into a sheet having a thickness of 1.0 mm. After at least 24 hours after the press forming, the sheet was analyzed by X-ray diffractometry to determine the degree of crystallinity.
(10) Odor
The odor of a graft-modified propylene.α-olefin copolymer was evaluated by a sensory test. Specifically, pellets of the graft-modified propylene.α-olefin copolymer were placed into a petri dish with a glass lid. The dish was then stored in a thermostatic chamber at 50° C. for 1 hour, cooled to room temperature, and allowed to stand for about 5 minutes. Thereafter, the lid was slightly opened and the smell was checked. The intensity of the odor was evaluated based on the following two criteria.
Odorless: The odor was unperceivable or barely perceivable.
Odorous: The odor was easily perceived.
(11) Gel Content
A one-liter three-necked flask equipped with a stirrer was charged with approximately 10 g of a graft-modified propylene.α-olefin copolymer and 500 ml of special grade p-xylene manufactured by Wako Pure Chemical Industries, Ltd., and the mixture was stirred under reflux for 3 hours. While maintaining the solution temperature constant, the whole solution was hot filtered through a G4 glass filter. The solid gel retained on the filter plate was recovered and dried to determine the weight thereof and the ratio (wt %) relative to the graft-modified copolymer. The gel content was evaluated as A when the weight ratio was not more than 2.0 wt %, B when the weight ratio was from above 2.0 wt % to 2.5 wt %, and C when the weight ratio was above 2.5 wt %.

Of the propylene.α-olefin copolymers (a) subjected to graft reaction, propylene.1-butene copolymers (a-1) to (a-3) were prepared as described in Production Examples 1 to 3 below. Propylene.1-butene-ethylene copolymers used in Comparative Examples were prepared (Production Examples 4 and 5) in accordance with the methods described in Examples in WO 2004/106430A. Other polymers used as raw materials to be modified were purchased from the market.

Production Example 1

A 2-L autoclave that had been thoroughly purged with nitrogen was charged with 900 ml of hexane and 90 g of 1-butene, and 1 mmol of triisobutylaluminum was added. The temperature was increased to 70° C., and propylene was supplied to control the total pressure to 7 kg/cm$^2$G. Further, 0.30 mmol of methylaluminoxane, and 0.001 mmol in terms of Zr atoms of rac-dimethylsilylene-bis{1-(2-methyl-4-phenylindenyl)}zirconium dichloride were added. Polymerization was performed for 30 minutes while continuously supplying propylene to maintain the total pressure at 7 kg/cm$^2$G. After the polymerization, the autoclave was depressurized and the polymer was recovered in a large amount of methanol. The polymer was vacuum dried at 110° C. for 12 hours.

The propylene.α-olefin polymer (a-1) obtained weighed 39.7 g, and the polymerization activity was 79 kg·polymer/mmol Zr·hr. The polymer contained 74 mol % of propylene-derived units and 26 mol % of 1-butene-derived units, and had a MFR of 7 g/10 min, a melting point of 75° C., a Mw/Mn of 2.1, a value B of 1.0, an intrinsic viscosity [η] of 1.9 (dl/g) and a degree of crystallinity of 41. The properties of the polymer (a-1) are described in Table 2. The propylene.α-olefin polymer (a-1) satisfies the relationship specified in the requirement (4): −2.6M+130≤T≤−2.3M+155, and satisfies the relationship specified in the requirement (5): C≥−1.5M+75.

Production Examples 2 and 3

Propylene.α-olefin polymers (a-2) and (a-3) were obtained in the same manner as in Production Example 1, except that the amount of 1-butene was changed. The amounts of 1-butene used in the polymers (a-2) and (a-3) are described in Table 2. The production example in which the polymer (a-2) was obtained was Production Example 2, and the production example which afforded the polymer (a-3) was Production Example 3. The properties of the polymers (a-2) and (a-3) are described in Table 2. The propylene.α-olefin polymers (a-2) and (a-3) satisfy the relationship specified in the requirement (4): −2.6M+130≤T≤−2.3M+155, and satisfy the relationship specified in the requirement (5): C≥−1.5M+75.

Production Example 4

A 2-L polymerizer that had been thoroughly purged with nitrogen was charged with 833 ml of dried hexane, 100 g of 1-butene, and triisobutylaluminum (1.0 mmol) at room temperature. The temperature inside the polymerizer was increased to 40° C., and the pressure in the system was increased to 0.76 MPa with propylene. Thereafter, the pressure in the system was controlled to 0.8 MPa with ethylene. Next, a toluene solution in which 0.001 mmol of dimethylmethylene(3-t-butyl-5-methylcyclopentadienyl)fluorenylzirconium dichloride was in contact with 0.3 mmol in terms of aluminum of methylaluminoxane (manufactured by TOSOH FINECHEM CORPORATION) was added to the polymerizer. Polymerization was performed for 20 minutes at an inside temperature of 40° C. while maintaining the pressure in the system at 0.8 MPa with ethylene. The polymerization was terminated by the addition of 20 ml of methanol. The polymerizer was depressurized, and the polymerization solution was poured into 2 L of methanol to precipitate the polymer, which was then dried in vacuum at 130° C. for 12 hours. The propylene.1-butene.ethylene copolymer (a-4) obtained weighed 36.4 g, and had an intrinsic viscosity [η] of 1.8 (dl/g), a glass transition point Tg of −29° C., an ethylene content of 16 mol %, a butene content of 6.5 mol %, and a GPC molecular weight distribution (Mw/Mn) of 2.1. The DSC measurement did not show a clear melting peak in the amount of heat of fusion. The properties of the polymer (a-4) are described in Table 2.

Production Example 5

A 2-L polymerizer that had been thoroughly purged with nitrogen was charged with 917 ml of dried hexane, 85 g of 1-butene, and triisobutylaluminum (1.0 mmol) at room temperature. The temperature inside the polymerizer was increased to 65° C., and the pressure in the system was increased to 0.77 MPa with propylene. Thereafter, the pressure in the system was controlled to 0.78 MPa with ethylene. Next, a toluene solution in which 0.002 mmol of dimethylmethylene(3-t-butyl-5-methylcyclopentadienyl)fluorenylzirconium dichloride was in contact with 0.6 mmol in terms of aluminum of methylaluminoxane (manufactured by TOSOH FINECHEM CORPORATION) was added to the polymerizer. Polymerization was performed for 20 minutes at an inside temperature of 65° C. while maintaining the pressure in the system at 0.78 MPa with ethylene. The polymerization was terminated by the addition of 20 ml of methanol. The polymerizer was depressurized, and the polymerization solution was poured into 2 L of methanol to precipitate the polymer, which was then dried in vacuum at 130° C. for 12 hours. The propylene.1-butene.ethylene copolymer (a-5) obtained weighed 60.4 g, and had an intrinsic viscosity [η] of 1.81 (dl/g), a glass transition point Tg of −27° C., an ethylene content of 13 mol %, a butene content of 19 mol %, and a GPC molecular weight distribution (Mw/Mn) of 2.4. The DSC measurement did not show a clear melting peak in the amount of heat of fusion. The properties of the polymer (a-5) are described in Table 2.

[Other Raw Material Polymers]

Polymer (a-6): Vistamaxx 3000 (propylene.ethylene copolymer manufactured by Exxon Mobil Chemical Co., Ltd., MFR (230° C., 2.16 kg load): 7 g/10 min, ethylene content: 16 mol %, melting point: 76° C., Mw/Mn: 2.1)

Polymer (a-7): Adsyl 5C30F (random polypropylene manufactured by LyonDell Basell, MFR (230° C., 2.16 kg load): 5.5 g/10 min, butene content: 7 mol %, ethylene content: 2 mol %, melting point Tm: 138° C.)

Polymer (a-8): Prime Polypro F327 (random polypropylene manufactured by Prime Polymer Co., Ltd., MFR (230° C., 2.16 kg load): 7.3 g/10 min, butene content: 4 mol %, ethylene content: 1.5 mol %, melting point Tm: 139° C.)

Polymer (a-9): Prime Polypro F107 (propylene homopolymer manufactured by Prime Polymer Co., Ltd., MFR (230° C., 2.16 kg load): 7.2 g/10 min, melting point Tm: 168° C.)

The properties of the polymers (a-6) to (a-9) are described in Table 2.

TABLE 2

|  | Unit | a-1 | a-2 | a-3 | a-4 | a-5 | a-6 | a-7 | a-8 | a-9 |
|---|---|---|---|---|---|---|---|---|---|---|
| Propylene content | mol % | 74 | 78 | 85 | 77.5 | 68 | 84 | 91 | 94.5 | 100 |
| 1-Butene content | mol % | 26 | 22 | 15 | 6.5 | 19 | 0 | 7 | 4 | 0 |
| Ethylene content | mol % | 0 | 0 | 0 | 16 | 13 | 16 | 2 | 1.5 | 0 |
| MFR (230° C., 2.16 kg) | g/10 min | 7 | 7 | 7 | ND | ND | 7 | 5.5 | 7.3 | 7.2 |
| Melting point (DSC-Tm) | ° C. | 75 | 83 | 98 | Not observed | Not observed | 76 | 138 | 139 | 168 |
| Mw/Mn | — | 2.1 | 2.1 | 2.1 | 2.1 | 2.4 | 2.1 | ND | ND | ND |
| Value B | — | 1.0 | 1.0 | 1.0 | ND | ND | ND | ND | ND | ND |
| Intrinsic viscosity [η] | dl/g | 1.9 | 1.9 | 1.9 | 1.8 | 1.8 | ND | ND | ND | ND |
| Degree of crystallinity | % | 41 | 46 | 55 | ND | ND | ND | ND | ND | ND |

Note)
ND in the table indicates Not Determined.

[Example 1] Production of Graft-Modified Propylene.α-Olefin Copolymer (A-1)

Extruder TEX30 (manufactured by The Japan Steel Works, Ltd.) was loaded with 100 parts by weight of the propylene.α-olefin copolymer (a-1), 2 parts by weight of maleic anhydride, and 0.3 parts by weight of PERHEXA 25B (2,5-dimethyl-2,5-di(t-butylperoxy)hexane, manufactured by NOF CORPORATION, one-minute half-life decomposition temperature: 179.8° C.). The extruder was operated under the following conditions to afford a graft-modified propylene.α-olefin copolymer (A-1). The polymer was tested to determine the presence or absence of odor, the gel content, the amount of grafting of (the amount of modification by) maleic anhydride, the amount of residual maleic acid, and the intrinsic viscosity. The results are described in Table 3.

Conditions for Operation of Extruder

Cylinder temperatures C2/C3/C4/C5/C6=50° C./170° C./200° C./200° C./200° C.

Screw rotational speed 240 rpm

Feeder rotational speed 65 rpm

The modified copolymer (A-1) was immersed in methylene chloride for 24 hours, and the extraction liquid was analyzed by gas chromatography (column filler: BX-10, column length 3 m, carrier gas: nitrogen, Shimadzu GC-2014, C-R8A). As a result, no peaks assigned to volatile hydrocarbon compounds were detected. Specifically, the concentration of volatile hydrocarbon compounds was below 1 ppm that was the detection limit.

(Evaluation of Bond Strength)

As a primer, a toluene solution (concentration: 35 wt %) of the graft-modified propylene.α-olefin copolymer (A-1) obtained by the above method was applied onto a 3 mm thick injection molded square plate of a block polypropylene (Prime Polypro J739E manufactured by Prime Polymer Co., Ltd., hereinafter, also written as bPP). The wet film was dried. A transparent acrylic resin top coat was formed thereon. The layers were bonded together at 120° C. and 0.1 MPa for 30 minutes to give a stack sample having a bPP layer/primer layer/top layer structure. At one end of the stack, the primer layer and the bPP layer were separated from each other. The separated ends were held with chucks of a 180° peel strength tester, and the peel strength was measured at a stress rate of 100 mm/min. The 180° peel strength was 1100 g/cm.

(Test of Stability of Aqueous Dispersion)

100 Parts by weight of the graft-modified propylene. α-olefin copolymer (A-1) obtained by the above method was mixed together with 4 parts by weight of potassium oleate as a surfactant. The mixture was added to a pressure kneader and was melt-kneaded at 180° C. for 30 minutes. To the kneader, a 20% aqueous potassium hydroxide solution was injected in an amount necessary for the complete neutralization of the carboxylic acid, and the mixture was kneaded for 30 minutes. The kneadate was recovered and was added to warm water. The mixture was stirred sufficiently to give an aqueous dispersion. The resultant aqueous dispersion had a solid concentration of 45% and a pH of 12, and exhibited good emulsion properties. The dispersion was free from white cloudy mottles.

[Example 2] Production of Graft-Modified Propylene.α-Olefin Copolymer (A-2)

A graft-modified propylene.α-olefin copolymer (A-2) was obtained in the same manner as in Example 1, except that PERHEXA 25B was used in an amount of 0.5 parts by weight. The polymer was tested to determine the presence or absence of odor, the gel content, the amount of grafting of (the amount of modification by) maleic anhydride, the amount of residual maleic acid, and the intrinsic viscosity. The results are described in Table 3.

[Example 3] Production of Graft-Modified Propylene.α-Olefin Copolymer (A-3)

A graft-modified propylene.α-olefin copolymer (A-3) was obtained in the same manner as in Example 1, except that PERHEXA 25B was used in an amount of 0.7 parts by weight. The polymer was tested to determine the presence or absence of odor, the gel content, the amount of grafting of (the amount of modification by) maleic anhydride, the amount of residual maleic acid, and the intrinsic viscosity. The results are described in Table 3.

[Example 4] Production of Graft-Modified Propylene.α-Olefin Copolymer (A-4)

A graft-modified propylene.α-olefin copolymer (A-4) was obtained in the same manner as in Example 1, except that the propylene.α-olefin copolymer (a-1) was replaced by the propylene.α-olefin copolymer (a-2). The polymer was tested to determine the presence or absence of odor, the gel content, the amount of grafting of (the amount of modification by) maleic anhydride, the amount of residual maleic acid, and the intrinsic viscosity. The results are described in Table 3.

[Example 5] Production of Graft-Modified Propylene.α-Olefin Copolymer (A-5)

A graft-modified propylene.α-olefin copolymer (A-5) was obtained in the same manner as in Example 4, except that PERHEXA 25B was used in an amount of 0.5 parts by weight. The polymer was tested to determine the presence or absence of odor, the gel content, the amount of grafting of (the amount of modification by) maleic anhydride, the amount of residual maleic acid, and the intrinsic viscosity. The results are described in Table 3.

[Example 6] Production of Graft-Modified Propylene.α-Olefin Copolymer (A-6)

A graft-modified propylene.α-olefin copolymer (A-6) was obtained in the same manner as in Example 4, except that the amount of PERHEXA 25B in Example 4 was changed to 0.7 parts by weight. The polymer was tested to determine the presence or absence of odor, the gel content, the amount of grafting of (the amount of modification by) maleic anhydride, the amount of residual maleic acid, and the intrinsic viscosity. The results are described in Table 3.

[Example 7] Production of Graft-Modified Propylene.α-Olefin Copolymer (A-7)

A graft-modified propylene.α-olefin copolymer (A-7) was obtained in the same manner as in Example 1, except that the propylene.α-olefin copolymer (a-1) was replaced by the propylene.α-olefin copolymer (a-3). The polymer was tested to determine the presence or absence of odor, the gel content, the amount of grafting of (the amount of modification by) maleic anhydride, the amount of residual maleic acid, and the intrinsic viscosity. The results are described in Table 3.

[Example 8] Production of Graft-Modified Propylene.α-Olefin Copolymer (A-8)

A graft-modified propylene.α-olefin copolymer (A-8) was obtained in the same manner as in Example 7, except that PERHEXA 25B was used in an amount of 0.5 parts by weight. The polymer was tested to determine the presence or absence of odor, the gel content, the amount of grafting of (the amount of modification by) maleic anhydride, the amount of residual maleic acid, and the intrinsic viscosity. The results are described in Table 3.

[Example 9] Production of Graft-Modified Propylene.α-Olefin Copolymer (A-9)

A graft-modified propylene.α-olefin copolymer (A-9) was obtained in the same manner as in Example 7, except that PERHEXA 25B was used in an amount of 0.7 parts by weight. The polymer was tested to determine the presence or absence of odor, the gel content, the amount of grafting of (the amount of modification by) maleic anhydride, the amount of residual maleic acid, and the intrinsic viscosity. The results are described in Table 3.

[Example 10] Production of Graft-Modified Propylene.α-Olefin Copolymer (A-10)

A graft-modified propylene.α-olefin copolymer (A-10) was obtained in the same manner as in Example 1, except that PERHEXA 25B was used in an amount of 1.0 part by weight. The polymer was tested to determine the presence or absence of odor, the gel content, the amount of grafting of (the amount of modification by) maleic anhydride, the amount of residual maleic acid, and the intrinsic viscosity. The results are described in Table 3. Further, the 180° peel strength was measured to be 400 g/cm by the method described in Example 1.

[Example 11] Production of Graft-Modified Propylene.α-Olefin Copolymer (A-11)

A graft-modified propylene.α-olefin copolymer (A-11) was obtained in the same manner as in Example 1, except that PERHEXA 25B was used in an amount of 1.5 parts by weight. The polymer was tested to determine the presence or absence of odor, the gel content, the amount of grafting of (the amount of modification by) maleic anhydride, the amount of residual maleic acid, and the intrinsic viscosity. The results are described in Table 3. Further, the 180° peel strength was measured to be 300 g/cm by the method described in Example 1. Cohesive failure was found in part of the primer layer.

[Comparative Example 1] Production of Graft-Modified Propylene.α-Olefin Copolymer (A-12)

A graft-modified propylene.α-olefin copolymer (A-12) was obtained in the same manner as in Example 1, except that PERHEXA 25B was replaced by PERHEXYN 25B (2,5-dimethyl-2,5-bis(t-butylperoxy)hexyne-3, manufactured by NOF CORPORATION, one-minute half-life decomposition temperature: 194.3° C.). The polymer was tested to determine the presence or absence of odor, the gel content, the amount of grafting of (the amount of modification by) maleic anhydride, the amount of residual maleic acid, and the intrinsic viscosity. The results are described in Table 4.

[Comparative Example 2] Production of Graft-Modified Propylene.α-Olefin Copolymer (A-13)

A graft-modified propylene.α-olefin copolymer (A-13) was obtained in the same manner as in Comparative Example 1, except that PERHEXYN 25B was used in an amount of 0.5 parts by weight. The polymer was tested to determine the presence or absence of odor, the gel content, the amount of grafting of (the amount of modification by) maleic anhydride, the amount of residual maleic acid, and the intrinsic viscosity. The results are described in Table 4.

[Comparative Example 3] Production of Graft-Modified Propylene.α-Olefin Copolymer (A-14)

A graft-modified propylene.α-olefin copolymer (A-14) was obtained in the same manner as in Comparative Example 1, except that PERHEXYN 25B was used in an amount of 0.7 parts by weight. The polymer was tested to determine the presence or absence of odor, the gel content, the amount of grafting of (the amount of modification by) maleic anhydride, the amount of residual maleic acid, and the intrinsic viscosity. The results are described in Table 4. An attempt to prepare an aqueous dispersion by the method described in Example 1 failed.

[Comparative Example 4] Production of Graft-Modified Propylene.α-Olefin Copolymer (A-15)

A graft-modified propylene.α-olefin copolymer (A-15) was obtained in the same manner as in Example 2, except that the propylene.α-olefin copolymer (a-1) was replaced by the propylene.α-olefin copolymer (a-6) (Vistamaxx 3000). The polymer was tested to determine the presence or absence of odor, and the gel content. The results are described in Table 4.

[Comparative Example 5] Production of Graft-Modified Propylene.α-Olefin Copolymer (A-16)

A graft-modified propylene.α-olefin copolymer (A-16) was obtained in the same manner as in Example 2, except that the propylene.α-olefin copolymer (a-1) was replaced by the propylene.1-butene.ethylene copolymer (a-4) prepared in Production Example 4. The polymer was tested to determine the presence or absence of odor, and the gel content. The results are described in Table 4.

[Comparative Example 6] Production of Graft-Modified Propylene.α-Olefin Copolymer (A-17)

A graft-modified propylene.α-olefin copolymer (A-17) was obtained in the same manner as in Example 2, except that the propylene.α-olefin copolymer (a-1) was replaced by the propylene.1-butene.ethylene copolymer (a-5) prepared in Production Example 5. The polymer was tested to determine the presence or absence of odor, and the gel content. The results are described in Table 4.

[Comparative Example 7] Production of Graft-Modified Propylene.α-Olefin Copolymer (A-18)

A graft-modified propylene.α-olefin copolymer (A-18) was obtained in the same manner as in Example 2, except that the propylene.α-olefin copolymer (a-1) was replaced by the propylene.α-olefin copolymer (a-7) (Adsyl 5C30F). The polymer was tested to determine the presence or absence of odor, and the gel content. The results are described in Table 4.

[Comparative Example 8] Production of Graft-Modified Propylene.α-Olefin Copolymer (A-19)

A graft-modified propylene.α-olefin copolymer (A-19) was obtained in the same manner as in Example 2, except that the propylene.α-olefin copolymer (a-1) was replaced by the propylene.α-olefin copolymer (a-8) (Prime Polypro F327). The polymer was tested to determine the presence or absence of odor, and the gel content. The results are described in Table 4.

[Comparative Example 9] Production of Graft-Modified Propylene.α-Olefin Copolymer (A-20)

A graft-modified propylene.α-olefin copolymer (A-20) was obtained in the same manner as in Example 2, except that the propylene.α-olefin copolymer (a-1) was replaced by the propylene.α-olefin copolymer (a-9) (Prime Polypro F107). The polymer was tested to determine the presence or absence of odor, and the gel content. The results are described in Table 4.

[Comparative Example 10] Production of Graft-Modified Propylene.α-Olefin Copolymer (A-21)

A graft-modified propylene.α-olefin copolymer (A-21) was obtained in the same manner as in Example 1, except that maleic anhydride was used in an amount of 1.0 part by weight and PERHEXA 25B in 0.2 parts by weight. The polymer was tested to determine the presence or absence of odor, the gel content, the amount of grafting of (the amount of modification by) maleic anhydride, and the amount of residual maleic acid. The results are described in Table 4. Further, the 180° peel strength was measured to be 320 g/cm by the method described in Example 1.

TABLE 3

| | | | Unit | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|---|
| Modifi- | Propylene | (a-1) | Parts by weight | 100 | 100 | 100 | | | | | | | 100 | 100 |
| cation | polymers | (a-2) | Parts by weight | | | | 100 | 100 | 100 | | | | | |
| formu- | | (a-3) | Parts by weight | | | | | | | 100 | 100 | 100 | | |
| lations | | (a-4) | Parts by weight | | | | | | | | | | | |
| | | (a-5) | Parts by weight | | | | | | | | | | | |
| | | (a-6) | Parts by weight | | | | | | | | | | | |
| | | (a-7) | Parts by weight | | | | | | | | | | | |
| | | (a-8) | Parts by weight | | | | | | | | | | | |
| | | (a-9) | Parts by weight | | | | | | | | | | | |
| | Maleic anhydride | | Parts by weight | 2 | 2 | 2 | 2 | 2 | 2 | 2 | 2 | 2 | 2 | 2 |
| | PERHEXA 25B | | Parts by weight | 0.3 | 0.5 | 0.7 | 0.3 | 0.5 | 0.7 | 0.3 | 0.5 | 0.7 | 1.0 | 1.5 |
| | PERHEXYN 25B | | Parts by weight | | | | | | | | | | | |

TABLE 3-continued

| | | Unit | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| | Modified copolymer No. | — | (A-1) | (A-2) | (A-3) | (A-4) | (A-5) | (A-6) | (A-7) | (A-8) | (A-9) | (A-10) | (A-11) |
| Properties | Odor | — | Odorless | Odorless | Odorless | Odorless | Odorless | Odorless | Odorless | Odorless | Odorless | Odorless | Odorless |
| | Gel content | — | (A) | (A) | (A) | (A) | (A) | (A) | (A) | (A) | (A) | (A) | (A) |
| | Amount of grafting | wt % | 0.69 | 0.88 | 0.99 | 0.66 | 0.84 | 0.95 | 0.69 | 0.88 | 0.99 | 1.23 | 1.41 |
| | Residual maleic acid | ppm | 830 | 430 | 29 | 860 | 400 | 35 | 840 | 440 | 36 | 22 | <10 |
| | Intrinsic viscosity | dl/g | 0.72 | 0.64 | 0.60 | 0.74 | 0.64 | 0.61 | 0.76 | 0.66 | 0.63 | 0.42 | 0.35 |

TABLE 4

| | | | Unit | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|---|---|
| Modification formulations | Propylene polymers | (a-1) | Parts by weight | 100 | 100 | 100 | | | | | | | 100 |
| | | (a-2) | Parts by weight | | | | | | | | | | |
| | | (a-3) | Parts by weight | | | | | | | | | | |
| | | (a-4) | Parts by weight | | | | | 100 | | | | | |
| | | (a-5) | Parts by weight | | | | | | 100 | | | | |
| | | (a-6) | Parts by weight | | | | 100 | | | | | | |
| | | (a-7) | Parts by weight | | | | | | | 100 | | | |
| | | (a-8) | Parts by weight | | | | | | | | 100 | | |
| | | (a-9) | Parts by weight | | | | | | | | | 100 | |
| | Maleic anhydride | | Parts by weight | 2 | 2 | 2 | 2 | 2 | 2 | 2 | 2 | 2 | 1.0 |
| | PERHEXA 25B | | Parts by weight | | | | 0.5 | 0.5 | 0.5 | 0.5 | 0.5 | 0.5 | 0.2 |
| | PERHEXYN 25B | | Parts by weight | 0.3 | 0.5 | 0.7 | | | | | | | |
| | Modified copolymer No. | | — | (A-12) | (A-13) | (A-14) | (A-15) | (A-16) | (A-17) | (A-18) | (A-19) | (A-20) | (A-21) |
| Properties | Odor | | — | Odorous | Odorous | Odorous | Odorless | Odorless | Odorless | Odorless | Odorless | Odorless | Odorless |
| | Gel content | | — | (A) | (A) | (A) | (C) | (C) | (B) | (C) | (C) | (B) | (A) |
| | Amount of grafting | | wt % | 0.21 | 0.45 | 0.65 | ND | ND | ND | ND | ND | ND | 0.33 |
| | Residual maleic acid | | ppm | 6400 | 5500 | 3700 | ND | ND | ND | ND | ND | ND | 800 |
| | Intrinsic viscosity | | dl/g | 1.17 | 0.97 | 0.84 | ND | ND | ND | ND | ND | ND | 0.70 |

Note)
ND in the table indicates Not Determined.

The invention claimed is:

1. An aqueous dispersion comprising a graft-modified propylene.α-olefin copolymer (A) obtained by graft-reacting a polar monomer onto a propylene.α-olefin copolymer (a) comprising 50 to 90 mol % of propylene-derived structural units (C3) and 10 to 50 mol % of C4-8 α-olefin-derived structural units (Cα) (wherein the total of the structural units C3 and Cα is 100 mol %), the graft-modified propylene.α-olefin copolymer satisfying the following requirements (i) to (iv) at the same time:
 (i) the amount of the polar monomer grafted is 0.4 to 1.5 wt %,
 (ii) the content of the polar monomer is not more than 1000 ppm,
 (iii) the content of a gel insoluble in xylene at 140° C. is not more than 2.5 wt %, and
 (iv) the content of a volatile hydrocarbon compound is not more than 10 ppm.

2. The aqueous dispersion according to claim 1, wherein the graft-modified propylene.α-olefin copolymer (A) has an intrinsic viscosity measured at 135° C. in decalin of 0.5 to 1.0 (dl/g).

3. The aqueous dispersion according to claim 1, wherein the propylene.α-olefin copolymer (a) satisfies the following requirements (1) to (3):
 (1) the intrinsic viscosity measured at 135° C. in decalin is 0.1 to 12 (dl/g),
 (2) the molecular weight distribution (Mw/Mn) measured by gel permeation chromatography (GPC) relative to polystyrenes is not more than 3.0, and
 (3) the parameter value B representing a randomness of a comonomer sequence distribution is 1.0 to 1.5.

4. The aqueous dispersion according to claim 1, wherein the C4-8 α-olefin is 1-butene.

5. The aqueous dispersion according to claim 4, wherein the propylene.α-olefin copolymer (a) further satisfies the requirements (4) and (5):
 (4) the melting point Tm measured by differential scanning calorimetry (DSC) is 60 to 140° C., and the melting point Tm (T° C.) and the content of 1-butene-derived structural units (M mol %) satisfy $-2.6M+130 \leq T \leq -2.3M+155$, and
 (5) the degree of crystallinity (C %) measured by X-ray diffractometry and the content of 1-butene-derived structural units (M mol %) satisfy $C \geq -1.5M+75$.

6. The aqueous dispersion according to claim 1, wherein the polar monomer is maleic acid or maleic anhydride.

7. The aqueous dispersion according to claim 1, wherein the graft-modified propylene.α-olefin copolymer (A) is produced by modifying the propylene.α-olefin copolymer (a) by melt-kneading, at a temperature of 120 to 220° C., a mixture including the propylene.α-olefin copolymer (a), 0.1 to 20 parts by weight of maleic anhydride (B) per 100 parts by weight of the copolymer (a), and 0.1 to 1.0 part by weight of an organic peroxide (C) per 100 parts by weight of the copolymer (a), the organic peroxide having a one-minute half-life decomposition temperature of 150 to 190° C.

8. A method for producing an aqueous dispersion of a graft modified propylene α-olefin copolymer (A) in which a graft modified propylene α-olefin copolymer (A) is dispersed and in which the graft modified propylene α-olefin copolymer (A) is obtained by graft-reacting a polar monomer onto a propylene.α-olefin copolymer (a) comprising 50 to 90 mol % of propylene-derived structural units (C3) and 10 to 50 mol % of C4-8 α-olefin-derived structural units (Cα) (wherein the total of the structural units C3 and Cα is 100 mol %), the graft-modified propylene.α-olefin copolymer satisfying the following requirements (i) to (iv) at the same time:
(i) the amount of the polar monomer grafted is 0.4 to 1.5 wt %,
(ii) the content of the polar monomer is not more than 1000 ppm,
(iii) the content of a gel insoluble in xylene at 140° C. is not more than 2.5 wt %, and
(iv) the content of a volatile hydrocarbon compound is not more than 10 ppm, comprising modifying a propylene.α-olefin copolymer (a) by melt-kneading, at a temperature of 120 to 220° C., a mixture including the propylene.α-olefin copolymer (a), 0.1 to 20 parts by weight of maleic anhydride (B) per 100 parts by weight of the copolymer (a), and 0.1 to 1.0 part by weight of an organic peroxide (C) per 100 parts by weight of the copolymer (a), the organic peroxide having a one-minute half-life decomposition temperature of 150 to 190° C.

9. A resin composition comprising a graft-modified polypropylene.α-olefin copolymer (A), obtained by graft-reacting a polar monomer onto a propylene.α-olefin copolymer (a) comprising 50 to 90 mol % of propylene-derived structural units (C3) and 10 to 50 mol % of C4-8 α-olefin-derived structural units (Cα) (wherein the total of the structural units C3 and Cα is 100 mol %), the graft-modified propylene.α-olefin copolymer satisfying the following requirements (i) to (iv) at the same time:
(i) the amount of the polar monomer grafted is 0.4 to 1.5 wt %,
(ii) the content of the polar monomer is not more than 1000 ppm,
(iii) the content of a gel insoluble in xylene at 140° C. is not more than 2.5 wt %, and
(iv) the content of a volatile hydrocarbon compound is not more than 10 ppm,
and one or more resins selected from polyamide resins and polypropylene resins.

10. A method of producing a resin composition containing a graft modified propylene α-olefin copolymer (A) in which a graft modified propylene α-olefin copolymer (A) is blended with one or more resins selected from polyamide resins and polypropylene resins and in which the raft modified propylene α-olefin copolymer (A) is obtained by graft-reacting a polar monomer onto a propylene.α-olefin copolymer (a) comprising 50 to 90 mol % of propylene-derived structural units (C3) and 10 to 50 mol % of C4-8 α-olefin-derived structural units (Cα) (wherein the total of the structural units C3 and Cα is 100 mol %), the graft-modified propylene.α-olefin copolymer satisfying the following requirements (i) to (iv) at the same time:
(i) the amount of the polar monomer grafted is 0.4 to 1.5 wt %,
(ii) the content of the polar monomer is not more than 1000 ppm,
(iii) the content of a gel insoluble in xylene at 140° C. is not more than 2.5 wt %, and
(iv) the content of a volatile hydrocarbon compound is not more than 10 ppm, comprising modifying a propylene.α-olefin copolymer (a) by melt-kneading, at a temperature of 120 to 220° C., a mixture including the propylene.α-olefin copolymer (a), 0.1 to 20 parts by weight of maleic anhydride (B) per 100 parts by weight of the copolymer (a), and 0.1 to 1.0 part by weight of an organic peroxide (C) per 100 parts by weight of the copolymer (a), the organic peroxide having a one-minute half-life decomposition temperature of 150 to 190° C.

* * * * *